United States Patent
Namuduri et al.

(10) Patent No.: US 7,973,504 B2
(45) Date of Patent: Jul. 5, 2011

(54) ELECTRIC POWER STEERING CONTROL

(75) Inventors: Chandra S. Namuduri, Troy, MI (US); Scott R. Kloess, Rochester Hills, MI (US); Suresh Gopalakrishnan, Farmington Hills, MI (US); Yat-Chung Tang, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 524 days.

(21) Appl. No.: 12/179,954

(22) Filed: Jul. 25, 2008

(65) Prior Publication Data

US 2009/0026994 A1 Jan. 29, 2009

Related U.S. Application Data (60) Provisional application No. 60/952,415, filed on Jul. 27, 2007.

(51) Int. Cl.
*H02P 7/00* (2006.01)
(52) U.S. Cl. ........................................ 318/432; 318/661
(58) Field of Classification Search .................. 318/461, 318/432, 434, 727, 661; 180/443, 446
See application file for complete search history.

(56) References Cited

U.S. PATENT DOCUMENTS

| 5,076,381 A | 12/1991 | Daido et al. |
| 5,253,725 A | 10/1993 | Nishimoto |
| 5,267,627 A | 12/1993 | Frank et al. |
| 6,598,699 B2 * | 7/2003 | Takehara et al. .............. 180/446 |
| 6,904,999 B2 * | 6/2005 | Kojo et al. .................... 180/422 |
| 7,093,687 B2 * | 8/2006 | Masaki et al. ................ 180/443 |
| 2002/0166319 A1 * | 11/2002 | Grebe et al. .................... 60/327 |
| 2005/0240332 A1 * | 10/2005 | Mori et al. ....................... 701/72 |
| 2006/0273247 A1 | 12/2006 | Sakamaki et al. |

* cited by examiner

*Primary Examiner* — Rina I Duda
(74) *Attorney, Agent, or Firm* — John A. Miller; Miller IP Group, PLC

(57) ABSTRACT

A method for improving a failure mode diagnostic of an electric power steering system by overcoming a motor electric lock condition due to position sensor signal corruption or other motor faults. If certain conditions are met, the method determines that the motor is in an electric lock condition, and then reduces a torque current command to the motor so that it is able to be rotated by a vehicle hand-wheel. Once the motor is able to be rotated, then the method determines whether certain conditions have been met to determine whether the position sensor is malfunctioning.

20 Claims, 6 Drawing Sheets

ELECTRIC POWER STEERING CONTROL

CROSS-REFERENCE TO RELATED APPLICATIONS

This application claims the benefit of the filing date of U.S. Provisional Patent Application Ser. No. 60/952,415, titled Electric Power Steering Control, filed Jul. 27, 2007.

BACKGROUND OF THE INVENTION

1. Field of the Invention

This invention relates generally to a method for improving a failure mode diagnostic of an electric power steering (EPS) system and, more particularly, to a method for improving a failure mode diagnostic of an EPS system by overcoming a motor electric lock condition as a result of position sensor signal corruption or other motor faults.

2. Discussion of the Related Art

Most modern electric power steering systems for vehicles employ a brushless permanent magnet synchronous motor coupled to the steering gear to generate a steering assist torque. A hand-wheel torque sensor is used to sense driver torque demand and a position sensor is used to detect the absolute motor position and the steering angle. An electronic control unit (ECU) controls the magnitude and phase of the motor currents to be in synchronism with the rotor position to control the motor torque using rotor absolute position and the driver hand-wheel torque. A corrupted motor position sensor signal could lead to reduced torque assist, or even a negative torque assist, that could result in an electric lock of the steering system.

For some applications, the detection of sensor signal degradation requires rotation of the motor. However, during an electric lock condition, it is generally not possible for the motor to rotate and hence the sensor signal degradation cannot easily be diagnosed to revert the system to a manual steering mode.

Known techniques for addressing this issue have compared the voltage levels of the motor position sensor signals, where the sensor can be a resolver or an optical encoder, to preset levels to determine any signal degradation, and disable the motor torque in the event of sensor malfunction.

SUMMARY OF THE INVENTION

In accordance with the teachings of the present invention, a method is disclosed for improving a failure mode diagnostic of an electric power steering system by overcoming a motor electric lock condition due to position sensor signal corruption or other motor faults. In one embodiment, an algorithm determines whether a motor lock condition exists by determining whether the vehicle speed is greater than a minimum vehicle speed, determining that a torque current command to the motor is greater than a predetermined torque current command, determining that the duration that the torque motor command is above a predetermined threshold has occurred for a predetermined period of time and determining that a change in the motor electric angle in a command direction is less than a predetermined minimum angle. If these conditions are met, then an algorithm reduces the torque current command to a predetermined minimum torque current command at a predetermined rate of change that causes the motor to be removed from the lock condition. Once the motor is able to rotate, the algorithm determines whether one of two conditions have been met using position sensor signals to determine that there is a malfunction.

Additional features of the present invention will become apparent from the following description and appended claims taken in conjunction with the accompanying drawings.

DETAILED DESCRIPTION OF THE EMBODIMENTS

The following discussion of the embodiments of the invention directed to a method for improving a failure mode diagnostic of an electric power steering system by overcoming a motor electric lock condition due to position sensor signal corruption or other motor faults is merely exemplary in nature, and is in no way intended to limit the invention or its applications or uses.

Figure 1:
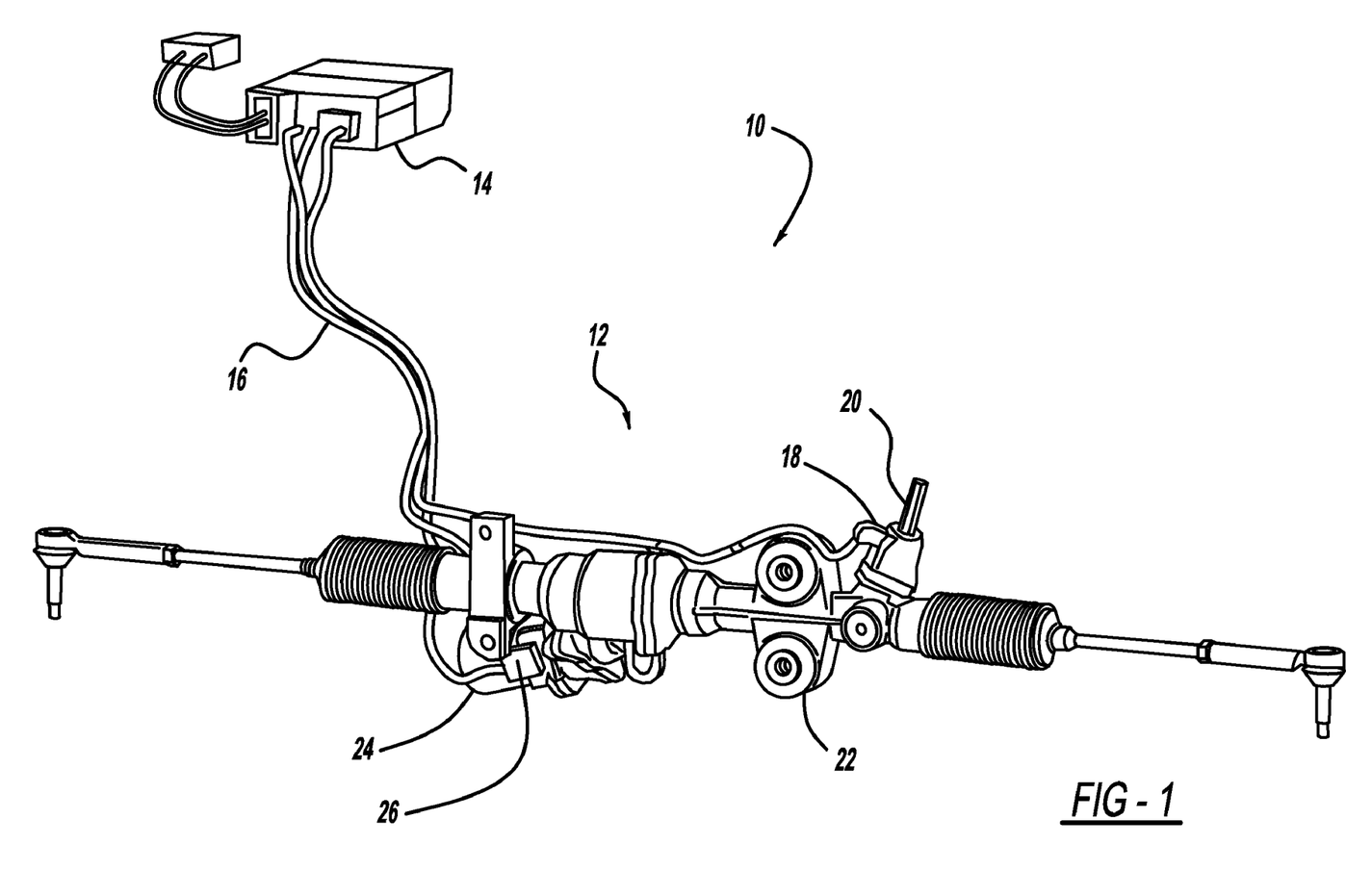
FIG. 1 is a perspective view of an EPS sub-system in a vehicle.

FIG. 1 is a perspective view of an EPS sub-system 10 for a vehicle. The EPS sub-system 10 includes a vehicle steering assembly 12 electrically coupled to an ECU unit 14 by a wire harness 16. The assembly 12 includes a torque sensor 18 that detects rotation of a shaft 20 that is rotated by a vehicle hand-wheel (not shown). The assembly 12 also includes a rack and pinion steering gear assembly 22 that transfers rotation of the hand-wheel to the wheels of the vehicle in a manner that is well understood to those skilled in the art. The assembly 12 also includes a brushless motor 24 and a position sensor 26. The motor 24 provides a torque assist to the vehicle hand-wheel and the steering gear assembly 22 to reduce the turning effort of the hand-wheel by the driver, as is well understood in the art. The position sensor 26 provides signals of the position of the motor 24 so that the ECU 14 can accurately provide the torque assist in the proper direction. The harness 16 can be an intermediate harness having three shielded wire bundles including a three-phase motor cable for the motor 24, a motor position sensor cable for the position sensor 26 and a torque sensor cable for the torque sensor 18. The hand-wheel may provide 0-4 Nm of torque, which the rack and pinion steering assembly 22 may convert to 0-400 N of force and the assist torque of the motor 24 may provide 0-14,000 Nm of force.

In this non-limiting embodiment, the position sensor 26 is a resolver based EPS motion position sensor, well known to those skilled in the art. Other applicable position sensors include optical encoders and Hall effect sensors. A resolver is an electromechanical device that detects a mechanical angle of a motor using amplitude modulated carrier signals. The resolver includes an excitation winding that is supplied with an AC voltage of fixed amplitude and fixed frequency. The resolver also includes two output windings, one of which provides a voltage signal $E_{sin}$ proportional to the sine of the angle of rotation between the stator and the rotor in the motor 24, and another that provides a voltage signal $E_{cos}$ proportional to the cosine of the angle of rotation between the stator and the rotor in the motor 24. The output voltage signals $E_{sin}$ and $E_{cos}$ are sampled by the ECU unit 14, and are used to calculate the mechanical angle θ of the motor 24 using the trigonometric relationship $\theta = \arctan(E_{sin}/E_{cos})$. The electrical angle $\theta_e$ of an N-pole AC electric machine is related to the mechanical angle θ by $\theta_e = (N/2)*\theta$. For a 14-pole machine, a 1° mechanical error results in a 7° electrical error. A 90° electrical angular position error results in zero assist from the motor 24. A torque with a 180° electrical error results in a motor electric lock condition where the motor force is directly opposed to the torque provided by the hand-wheel and the gear system 22.

The motor 24 is typically an AC machine that includes three coils on the stator and permanent magnets on the rotor. Current signals applied to the stator coils that are in-phase with the voltage generated by the motor 24 cause the motor 24 to provide positive torque, and current signals applied to the stator coils that are 180° out-of-phase with the voltage generated by the motor 24 cause the motor 24 to provide negative torque. If the position sensor 26 does not give an accurate position, then the ECU 14 may provide current signals to the stator windings that it thinks are in phase with the voltage generated by the motor 24, which may not be true. If the phase difference between the winding currents and the respective induced voltages becomes 180°, where the torque applied by the motor 24 is in the exact opposite direction to the desired torque, then the motor 24 is in an electric lock condition.

Degradation of the $E_{sin}$ and $E_{cos}$ voltage signals can be detected by monitoring the fluctuation of the magnitude of the vector sum of the $E_{sin}$ and $E_{cos}$ or its square, which is given by $(E_{sin}^2 + E_{cos}^2)$, from a value that will be nearly constant under normal conditions. Known systems for detecting fluctuations in the $(E_{sin}^2 + E_{cos}^2)$ signals required that the rotor of the motor 24 turn at least one revolution. If the fluctuation exceeds a predetermined threshold, then it is known that the position sensor 26 is not providing an accurate reading of the position of the motor 24, which could eventually cause the motor 24 to go into an electric lock condition that directly opposes the turning of the hand-wheel. Therefore, it is generally necessary to disable the motor 24 under those conditions.

Figure 2:
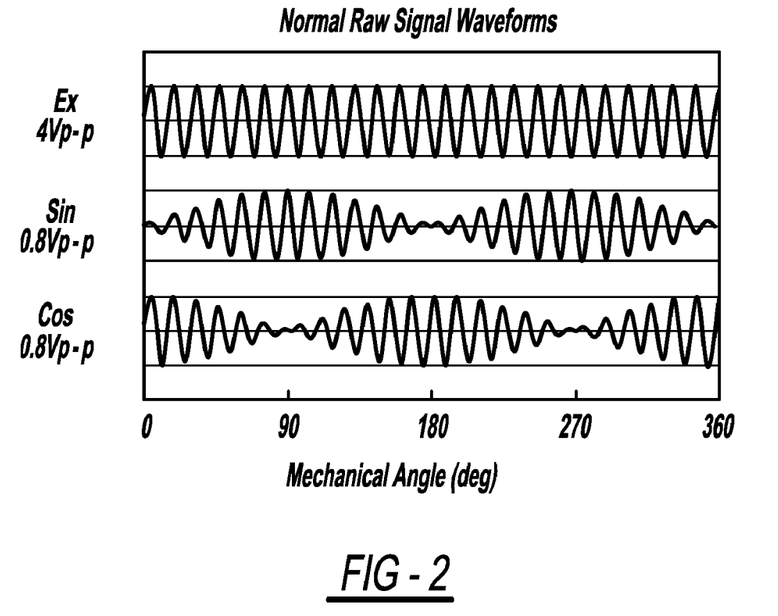
FIG. 2 is a graph with mechanical angle on the horizontal axis showing an excitation waveform, a sine waveform and a cosine waveform for a resolver type position sensor for a torque assist motor in the EPS sub-system shown in FIG. 1.

FIG. 2 is a graph with mechanical angle θ on the horizontal axis and voltage on the vertical axis showing the three signals for the coils in the resolver position sensor 26. These signals include an excitation signal (Ex), a sine signal (Sin) and a cosine signal (Cos). From these signals, the motor angle θ can be determined by the following equations:

$$E_r = E\sin\omega t \tag{1}$$

$$E_{sin} = KE\sin\omega t \cdot \sin\theta \tag{2}$$

$$E_{cos} = KE\sin\omega t \cdot \cos\theta \tag{3}$$

$$\theta = \tan^{-1}\left(\frac{E_{sin}}{E_{cos}}\right) \tag{4}$$

Because the excitation signal applied to the position sensor 26 and the sine and cosine signals received from the sensor coils have this relationship and exhibit a fairly constant value for the magnitude of the vector sum of the $E_{sin}$ and $E_{cos}$ signals under normal conditions, it is possible to tell if any of the signals have been corrupted as a result of short circuits or other electrical failures.

Figure 3:
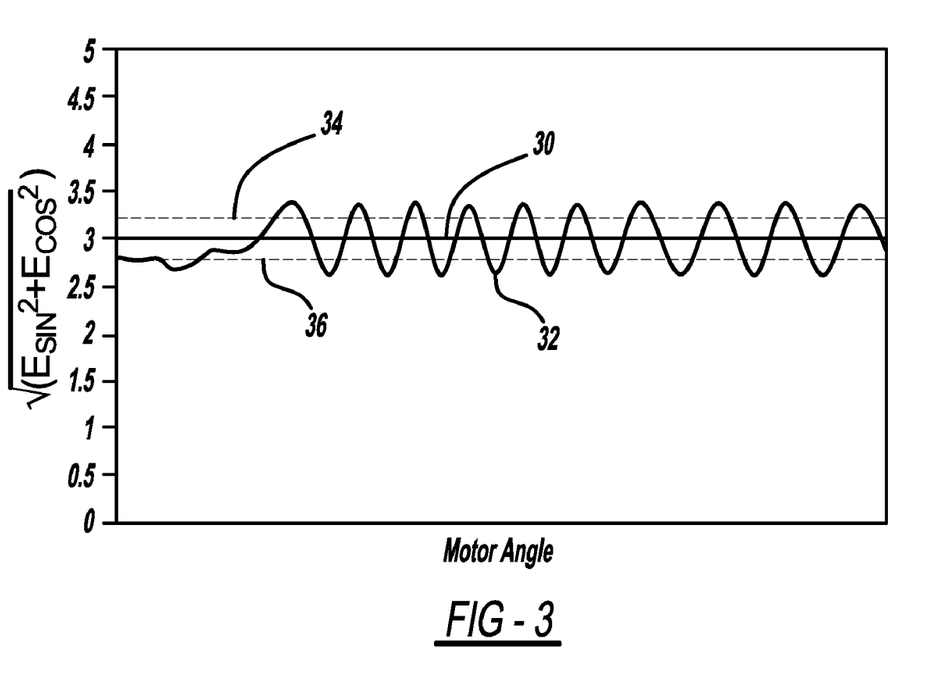
FIG. 3 is a graph with motor angle on the horizontal axis and a relationship between the sine and cosine signals of the position sensor on the vertical axis showing that fluctuations in the magnitude of the vector sum of position sensor signals above a predetermined threshold indicates sensor signal failure.

FIG. 3 is a graph with motor angle θ on the horizontal axis and $\sqrt{(E_{sin}^2 + E_{cos}^2)}$ on the vertical axis showing that the relationship between the sine and cosine voltage signals will closely follow a straight line 30 under normal operating conditions. If either of the sine or cosine signals is corrupted, the relationship $\sqrt{(E_{sin}^2 + E_{cos}^2)}$ will be a wave shaped signal 32, which fluctuates with rotor angle. If the signal 32 exceeds a predetermined threshold in either the positive or negative direction, represented here as dotted lines 34 and 36, then one or both of the sine and cosine signals are significantly corrupted and the ECU 14 will issue the appropriate diagnostics to correct the situation.

Figure 4:
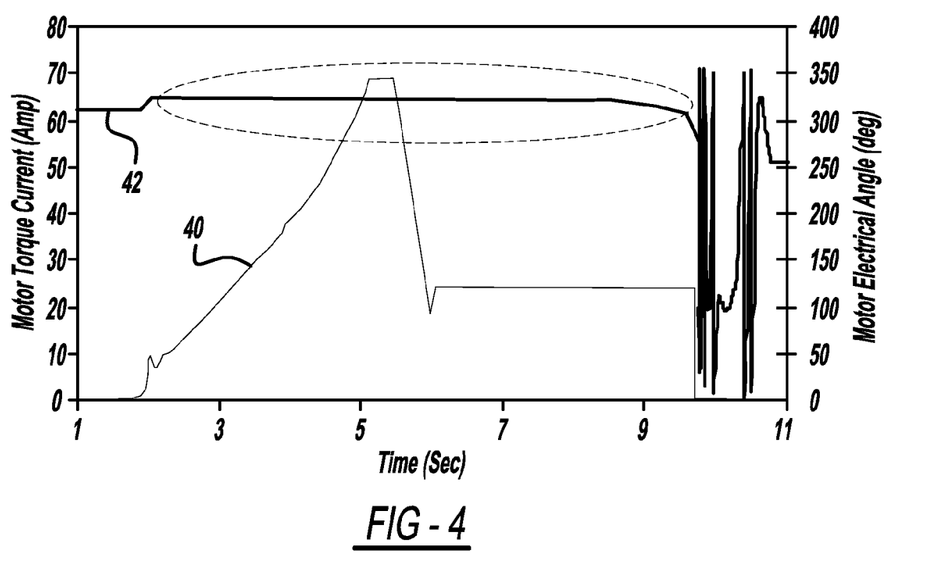
FIG. 4 is a graph with time on the horizontal axis and motor torque current on the left vertical axis and motor electrical angle on the right vertical axis showing a locked motor condition as a result of position sensor signal error by showing a small change in motor electrical angle in response to a high motor torque current.

FIG. 4 is a graph with time on the horizontal axis, motor torque current $I_Q$ on the left vertical axis and the motor electrical angle $\theta_e$ on the right vertical axis. In this example, the cosine and excitation signals of the position sensor 26 have been shorted with a 120 k ohm resistor so that the motor 24 is in an electric lock condition. Line 40 represents the magnitude of the motor torque current $I_Q$ applied to the stator windings in the motor 24 in response to turning of the vehicle hand-wheel. Line 42 shows that the motor electric angle $\theta_e$ remains substantially unchanged between time 2 sec and 10 sec because the motor 24 is the electric lock condition as a result of the cosine and excitation signals being shorted out in the position sensor 26. Once the motor torque current $I_Q$ is reduced to zero well before 10 sec, then the motor 24 will become unlocked at about time 10.

This motor position sensor signal condition can be monitored by a condition monitoring signal $C_1$ as:

$$C_1 = [\text{Max}(E_{sin}^2 + E_{cos}^2) - \text{Min}(E_{sin}^2 + E_{cos}^2)] \tag{5}$$

A normalized condition monitoring signal $C_2$ defined by equation (6) below can also be used to monitor the position sensor signal integrity.

$$C_2 = \frac{[\text{Max}(E_{sin}^2 + E_{cos}^2) - \text{Min}(E_{sin}^2 + E_{cos}^2)]}{[\text{Max}(E_{sin}^2 + E_{cos}^2) + \text{Min}(E_{sin}^2 + E_{cos}^2)]} \tag{6}$$

Figure 5:
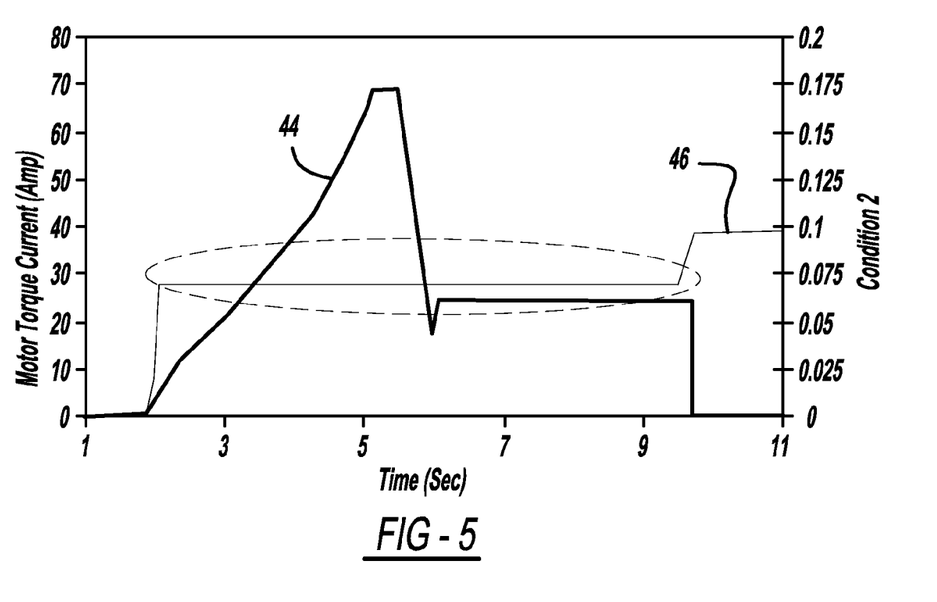
FIG. 5 is a graph with time on the horizontal axis, motor torque current on the left vertical axis and a position sensor condition monitoring signal on the right vertical axis showing a locked motor condition in response to a high motor torque current.

FIG. 5 is a graph with time on the horizontal axis, motor torque current on the left vertical axis and the condition monitoring signal $C_2$ on the right vertical axis. Graph line 44 shows that a significant amount of torque is requested from the motor 24, but there is no change in the motor position sensor condition monitoring signal at line 46 as a result of the motor 24 being in an electric lock condition as a result of sensor signal corruption.

The present invention proposes an algorithm to improve the safety function and diagnostic of an electric power steering (EPS) system by overcoming a motor electric lock condition due to position sensor signal corruption or other motor faults. The algorithm uses vehicle velocity $V_C$, motor torque current command $I_Q$, motor position signal variation and the resolver signal condition monitoring signals $C_1$ and $C_2$ to detect an electric lock condition. The algorithm then reduces the motor torque command $I_Q$ to a low enough level so that the motor torque can easily be overcome by the driver so that the motor becomes unlocked and fluctuations in the signals $C_1$ and $C_2$ due to the corrupted position sensor signals can be detected. The algorithm is only activated at vehicle speeds above a predetermined speed, such as 10 kph. If the driver hand-wheel torque that dictates motor torque current commands in a given direction continuously exceeds a predetermined value for a predetermined time, and the motor electric angle $\theta_e$ does not change in the commanded direction by a minimum predetermined amount, the motor torque current command $I_Q$ is reduced at a predetermined rate to a predetermined lower level that can be a predefined function of the vehicle speed. For the lower current command, the motor 24 will be able to rotate in response to the hand-wheel being rotated. If the resolver condition monitoring signals $C_1$ or $C_2$ then exceed predetermined thresholds, the motor 24 is disabled so that the EPS system reverts to a manual mode with the diagnostic code set for driver indication.

Figure 6:
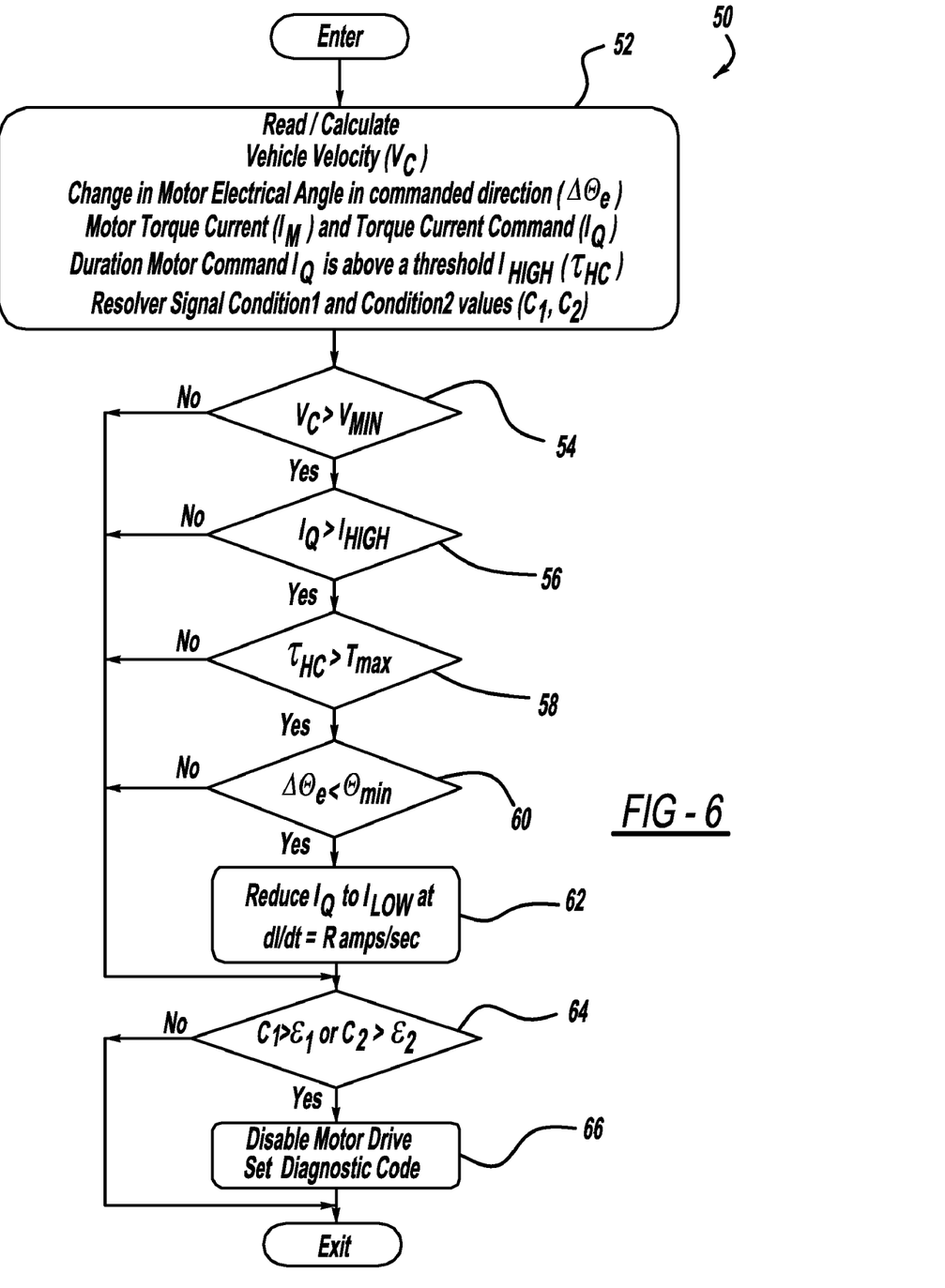
FIG. 6 is a flow chart diagram showing a method for overcoming a locked motor condition in an EPS system due to position sensor signal corruption, according to an embodiment of the present invention.

FIG. 6 is a flow chart diagram showing a process for detecting and overcoming a motor electric lock condition as a result of position sensor signal corruption, according to one embodiment of the present invention. The algorithm reads or calculates a number of different vehicle parameters at box 52, including the vehicle velocity $V_C$, changes in the motor electrical angle $\theta_e$ in the command direction $\Delta\theta_e$, the motor torque current $I_M$ and the motor torque current command signal $I_Q$. Further, the algorithm determines how long the motor current command signal $I_Q$ has been above a predetermined threshold $I_{HIGH}$, such as 50 A, as time $\tau_{HC}$. The algorithm also calculates the condition monitoring signals $C_1$ and $C_2$ from equations (5) and (6).

The algorithm then determines whether the vehicle speed $V_C$ is greater than a predetermined minimum vehicle speed $V_{MIN}$, such as 10 kph, at decision diamond 54. If the vehicle speed $V_C$ is high enough at the decision diamond 54, then the algorithm determines whether the torque current command signal $I_Q$ is greater than the predetermined threshold $I_{HIGH}$ at decision diamond 56. If the torque current command $I_Q$ is high enough at the decision diamond 56, then the algorithm determines whether the time that the motor current command signal $I_Q$ has been above the threshold $I_{HIGH}$ is greater than a predetermined time $T_{max}$, such as 0.15 seconds, at decision diamond 58. If this condition is met, the algorithm then determines whether a change in the motor electrical angle $\theta_e$ in a commanded direction $\Delta\theta_e$ is less than a predetermined minimum angle $\theta_{MIN}$, such as 30°, at decision diamond 60. Simultaneously with this check, the algorithm can check on variations in the condition monitoring signals $C_1$ and $C_2$. All of the predetermined values, such as $V_{MIN}$, $I_{HIGH}$, $\tau_{HC}$, $T_{max}$, $\theta_{MIN}$, etc., are values that can be calibrated based on simulations and tests for a particular vehicle and application.

If all of the conditions have been satisfied at the decision diamonds 54, 56, 58 and 60, the motor 24 is probably in an electric lock condition, then the algorithm reduces the torque current command signal $I_Q$ to a minimum torque current command $I_{LOW}$ at a certain relatively slow ramp down rate R=dI/dt at box 62, where $I_{LOW}$ can be 10 A, for example, and the ramp down rate R can be 100 A/sec, for example, in one non-limiting embodiment. The values of the minimum torque current command $I_{LOW}$ and the ramp down rate R can be functions of the vehicle speed $V_C$.

Once the algorithm reduces the torque current command signal $I_Q$ to the $I_{LOW}$ value, which will cause the rotor in the motor 24 to become unlocked and move, the algorithm can then determine whether either of the condition monitoring signals $C_1$ and $C_2$ exceeds predetermined thresholds $\epsilon_1$ and $\epsilon_2$, respectively, at decision diamond 64 to determine whether the position sensor signals are faulty by known techniques. If any of the criteria or conditions are not met at the decision diamonds 54, 56, 58 and 60, then the rotor in the motor 24 should be rotating and not be locked, and thus, the algorithm can proceed directly to the decision diamond 64 to determine whether the condition monitoring signals $C_1$ and $C_2$ exceed the predetermined thresholds $\epsilon_1$ and $\epsilon_2$. If either of the condition monitoring signals $C_1$ and $C_2$ do exceed the predetermined thresholds $\epsilon_1$ and $\epsilon_2$, as discussed above with reference to FIG. 3, then the algorithm sets the appropriate diagnostic code at box 66 to notify the vehicle operator of the abnormal condition.

Figure 7:
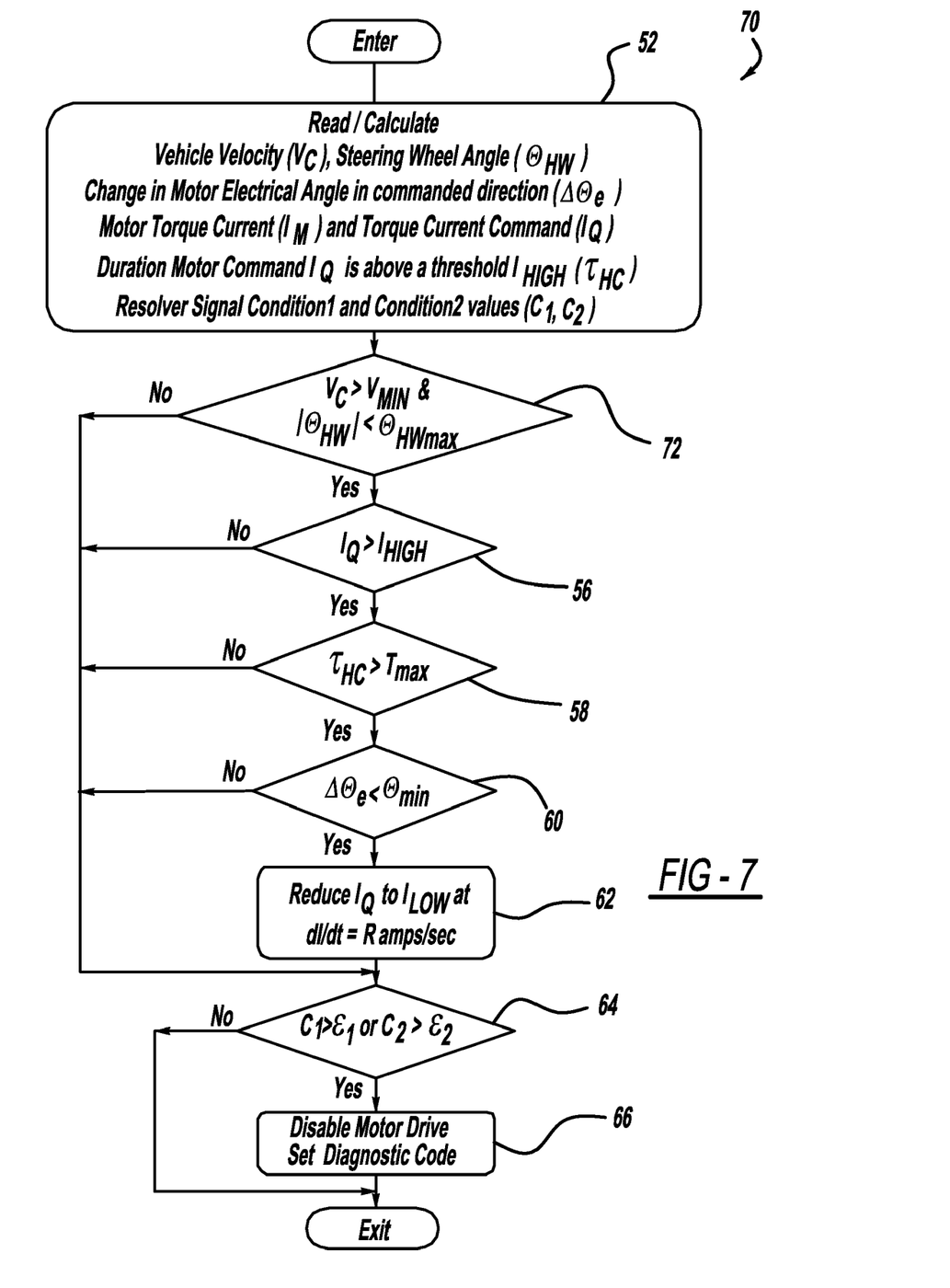
FIG. 7 is a flow chart diagram showing a method for overcoming a locked motor condition in an EPS system due to position sensor signal corruption, according to another embodiment of the present invention.

FIG. 7 is a flow chart diagram 70 showing another process for overcoming a motor lock condition as a result of position sensor signal corruption, according to another embodiment of the present invention, where like steps to the flow chart diagram 50 are identified by the same reference numeral. In this embodiment, the torque current command signal $I_Q$ is only reduced to $I_{LOW}$ if the hand-wheel is not turned to its maximum position and the other conditions are met. Particularly, in decision diamond 72, not only does the algorithm determine if the vehicle speed $V_C$ is high enough, but it also determines whether the hand-wheel angle $\theta_{HW}$ is less than a maximum hand-wheel angle $\theta_{HWmax}$. This may be desirable because if the hand-wheel is turned to its maximum position, then high torque currents would be provided in the normal operation of the motor 24. In one non-limiting embodiment, the maximum hand-wheel angle $\theta_{HWmax}$ is in the range of 360° to 500°.

Figure 8:
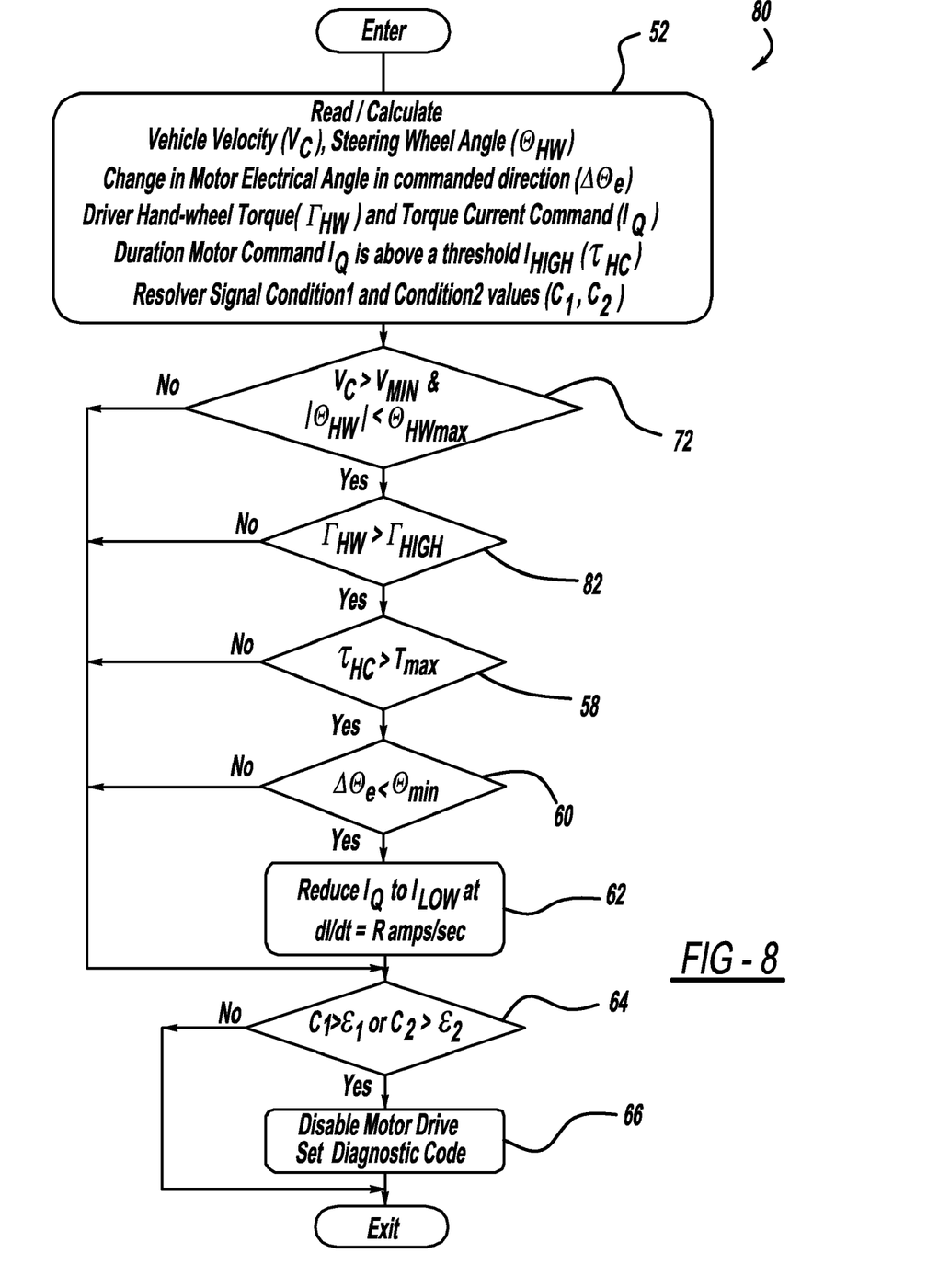
FIG. 8 is a flow chart diagram showing a method for overcoming a locked motor condition of an EPS system due to position sensor signal corruption, according to another embodiment of the present invention.

FIG. 8 is a flow chart diagram 80 showing another process for overcoming a motor lock condition as a result of position sensor signal corruption, according to another embodiment of the present invention, where like steps to the flow chart diagrams 50 and 70 are identified by the same reference numeral. In this embodiment, instead of determining whether the torque current command signal $I_Q$ is greater than a high torque current command $I_{HIGH}$ at the decision diamond 52, the algorithm determines whether a driver hand-wheel angle torque $\Gamma_{HW}$ is greater than a certain maximum hand-wheel torque $\Gamma_{HIGH}$, such as 6 Nm, as sensed by the torque sensor 18, at decision diamond 82.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for detecting and overcoming a motor lock condition of a steering assist motor as a result of position sensor signal corruption of a position sensor sensing the position of the motor in a vehicle, said method comprising:

determining a speed of the vehicle;
determining a change in an electrical angle of the motor in a commanded direction of the motor;
determining a torque current command for the motor;
determining how long the torque current command has been above a predetermined threshold;
reducing the torque current command to a predetermined low torque current command if the vehicle speed is greater than a predetermined minimum speed, the torque current command is greater than a predetermined torque current command threshold, the time that the torque current command has been above the predetermined current command threshold is greater than a predetermined maximum duration and the change in the electrical angle of the motor in a commanded direction is less than a predetermined minimum angle; and
determining if at least one condition monitoring signal of the position sensor is greater than a predetermined condition threshold.

2. The method according to claim 1 further comprising determining whether a turn angle of a vehicle hand-wheel is less than a predetermined maximum turn angle, and wherein reducing the torque current command to a predetermined low torque current command is done only if the hand-wheel angle is less than the predetermined maximum angle.

3. The method according to claim 1 further comprising determining whether a vehicle hand-wheel torque is greater than a predetermined hand-wheel torque, and wherein reducing the torque current command to a predetermined low torque current command is done only if the hand-wheel torque is greater than the predetermined hand-wheel torque.

4. The method according to claim 1 further comprising disabling the steering assist motor and setting a vehicle diagnostic if the at least one condition monitoring signal is greater than the predetermined condition threshold.

5. The method according to claim 1 wherein determining if at least one condition monitoring signal is greater than a predetermined condition threshold includes determining whether either of two condition monitoring signals is greater than separate condition thresholds.

6. The method according to claim 5 wherein the two condition monitoring signals are $C_1$ and $C_2$, and are defined by the equations:

$$C_1 = [\text{Max}(E_{sin}^2 + E_{cos}^2) - \text{Min}(E_{sin}^2 + E_{cos}^2)]$$

$$C_2 = \frac{[\text{Max}(E_{sin}^2 + E_{cos}^2) - \text{Min}(E_{sin}^2 + E_{cos}^2)]}{[\text{Max}(E_{sin}^2 + E_{cos}^2) + \text{Min}(E_{sin}^2 + E_{cos}^2)]}$$

where $E_{sin}$ is a voltage signal proportional to the sine of the angle of rotation between a stator and a rotor in the motor and $E_{cos}$ is a voltage signal proportional to the cosine of the angle of rotation between the stator and the rotor in the motor.

7. The method according to claim 1 wherein the predetermined minimum speed is about 10 kph, the predetermined torque current command threshold is about 50 A, the predetermined maximum duration is about 0.15 seconds, the predetermined minimum angle is about 30°, and the predetermined low torque current command is about 10 A.

8. The method according to claim 1 wherein reducing the torque current command to a predetermined low torque current command includes reducing the torque current command at a predetermined ramp rate.

9. The method according to claim 8 wherein the predetermined low torque current command and the predetermined ramp rate are functions of the vehicle speed.

10. The method according to claim 8 wherein the predetermined ramp rate is about 100 A/sec.

11. The method according to claim 1 wherein the position sensor is a resolver.

12. The method according to claim 1 wherein the motor is an AC machine including three coils in a stator of the motor and permanent magnets in a rotor of the motor.

13. A method for detecting and overcoming a motor lock condition of a steering assist motor, said method comprising:
determining that the steering assist motor is in an electric lock condition if a speed of the vehicle is greater than a predetermined minimum speed, a torque current command of the motor is greater than a predetermined torque current command threshold, the time that the torque current command has been above a predetermined current command threshold is greater than a predetermined maximum threshold and a change in an electrical angle of the motor in a commanded direction is less than a predetermined minimum angle; and
reducing the torque current command to a predetermined low torque current command if the steering assist motor is in the lock condition.

14. The method according to claim 13 wherein determining that the steering assist motor is in the lock condition also includes determining that a turn angle of a vehicle hand-wheel is less than a predetermined maximum turn angle.

15. The method according to claim 13 wherein determining that the steering assist motor is in the lock condition also includes determining whether a vehicle hand-wheel torque is greater than a predetermined hand-wheel torque.

16. The method according to claim 13 further comprising determining whether a motor position sensor has failed if the torque current command has been reduced by determining whether at least one sensor condition monitoring signal is greater than a predetermined condition monitoring threshold.

17. The method according to claim 16 wherein determining if at least one sensor condition monitoring signal is greater than a predetermined condition threshold includes determining whether either of two sensor condition monitoring signals is greater than separate condition thresholds.

18. The method according to claim 17 wherein the two condition monitoring signals are $C_1$ and $C_2$, and are defined by the equations:

$$C_1 = [\text{Max}(E_{sin}^2 + E_{cos}^2) - \text{Min}(E_{sin}^2 + E_{cos}^2)]$$

$$C_2 = \frac{[\text{Max}(E_{sin}^2 + E_{cos}^2) - \text{Min}(E_{sin}^2 + E_{cos}^2)]}{[\text{Max}(E_{sin}^2 + E_{cos}^2) + \text{Min}(E_{sin}^2 + E_{cos}^2)]}$$

where $E_{sin}$ is a voltage signal proportional to the sine of the angle of rotation between a stator and a rotor in the motor and $E_{cos}$ is a voltage signal proportional to the cosine of the angle of rotation between the stator and the rotor in the motor.

19. A method for detecting and overcoming a motor lock condition of a steering assist motor, said method comprising:
determining that the motor is in a lock condition if a vehicle speed is greater than a predetermined minimum speed, a torque current command for the motor is greater than a predetermined torque current command threshold, the time that the torque current command had been above a predetermined current command threshold is greater than a predetermined maximum duration, a change in the electrical angle of the motor in a commanded direction is less than a predetermined minimum angle, a turn angle of a vehicle hand-wheel is less than a predetermined maximum turn angle and a vehicle hand-wheel torque is greater than a predetermined hand-wheel torque; and reducing the torque current command to the motor if the lock condition is detected.

20. The method according to claim 19 further comprising determining whether a motor position sensor has failed if the torque current, command has been reduced by determining whether at least one sensor condition monitoring signal is greater than a predetermined condition monitoring threshold.

* * * * *